(12) United States Patent
O'Connor et al.

(10) Patent No.: US 11,014,503 B2
(45) Date of Patent: May 25, 2021

(54) VEHICLE STOWAGE BIN

(71) Applicant: Ford Global Technologies, LLC, Dearborn, MI (US)

(72) Inventors: Chris O'Connor, Livonia, MI (US); Michael J. Andrus, Northville, MI (US); Amanda Villerot, Beverly Hills, MI (US); Sue Muscat, South Lyon, MI (US); Jim Carene, Whitmore Lake, MI (US)

(73) Assignee: Ford Technologies, LLC, Dearborn, MI (US)

( * ) Notice: Subject to any disclaimer, the term of this patent is extended or adjusted under 35 U.S.C. 154(b) by 111 days.

(21) Appl. No.: 16/385,598

(22) Filed: Apr. 16, 2019

(65) Prior Publication Data

US 2020/0331399 A1 Oct. 22, 2020

(51) Int. Cl.
*B60R 7/04* (2006.01)
*B65D 43/26* (2006.01)
*B60R 7/02* (2006.01)
*B65D 43/14* (2006.01)

(52) U.S. Cl.
CPC .................. *B60R 7/04* (2013.01); *B60R 7/02* (2013.01); *B65D 43/14* (2013.01); *B65D 43/26* (2013.01); *B65D 2543/00444* (2013.01)

(58) Field of Classification Search
CPC .......... B60R 5/044; B60R 5/045; B60R 7/02; B60R 7/04; B65D 43/16; B65D 43/18; B65D 43/20; B65D 43/26
USPC ..................................... 296/24.34, 37.1, 37.8
See application file for complete search history.

(56) References Cited

U.S. PATENT DOCUMENTS

| | | | |
|---|---|---|---|
| 4,941,718 A * | 7/1990 | Alexander, III | B60R 11/02 296/37.7 |
| 6,086,133 A | 7/2000 | Alonso | |
| 6,241,300 B1 * | 6/2001 | Suzuki | B60N 3/12 296/37.8 |
| 6,893,072 B1 | 5/2005 | Graves | |
| 7,125,063 B2 * | 10/2006 | Kawamoto | B60N 2/793 296/37.8 |
| 7,234,746 B2 * | 6/2007 | Sakakibara | B60R 7/04 296/24.34 |
| 7,374,220 B2 * | 5/2008 | Ichimaru | B60R 7/06 296/24.34 |
| 7,794,000 B2 * | 9/2010 | Ichimaru | B60R 7/04 296/24.34 |
| 7,984,746 B2 | 7/2011 | Gao et al. | |
| 8,276,963 B2 * | 10/2012 | Ishikawa | H01R 13/72 296/24.34 |
| 8,844,995 B2 * | 9/2014 | Nagao | B60R 5/044 296/24.4 |

(Continued)

FOREIGN PATENT DOCUMENTS

| | | |
|---|---|---|
| DE | 10244301 A1 | 4/2004 |
| DE | 102006008663 A1 | 1/2007 |
| DE | 102008005907 A1 | 8/2009 |

*Primary Examiner* — Jason S Daniels
(74) *Attorney, Agent, or Firm* — David Coppiellie; Price Heneveld LLP

(57) ABSTRACT

A vehicle comprising a stowage bin, an actuation assembly configured to actuate in response to an actuation signal, and a stowage bin closure operable between stored and fully deployed positions, wherein the actuation assembly is configured to deploy the stowage bin closure over an opening defined by the stowage bin.

15 Claims, 11 Drawing Sheets

(56) References Cited

U.S. PATENT DOCUMENTS

| | | | |
|---|---|---|---|
| 9,156,334 B1 | 10/2015 | Robins et al. | |
| 9,174,583 B2 * | 11/2015 | Kuhn | B60R 7/04 |
| 9,937,867 B2 * | 4/2018 | Parra Becerra | B60R 7/06 |
| 2019/0314654 A1 * | 10/2019 | Lackore, Jr. | A62B 25/00 |

* cited by examiner

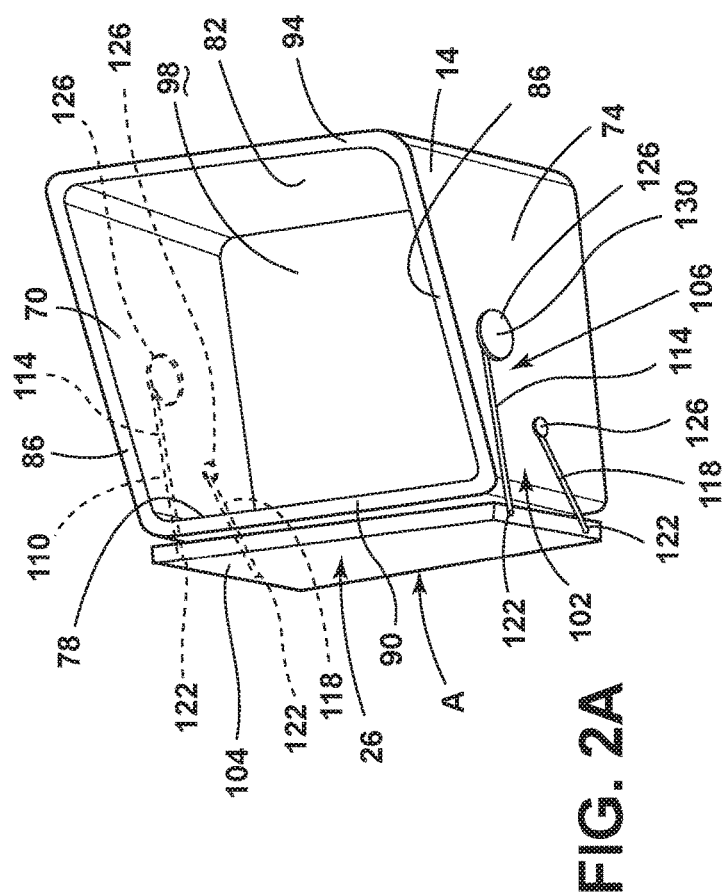
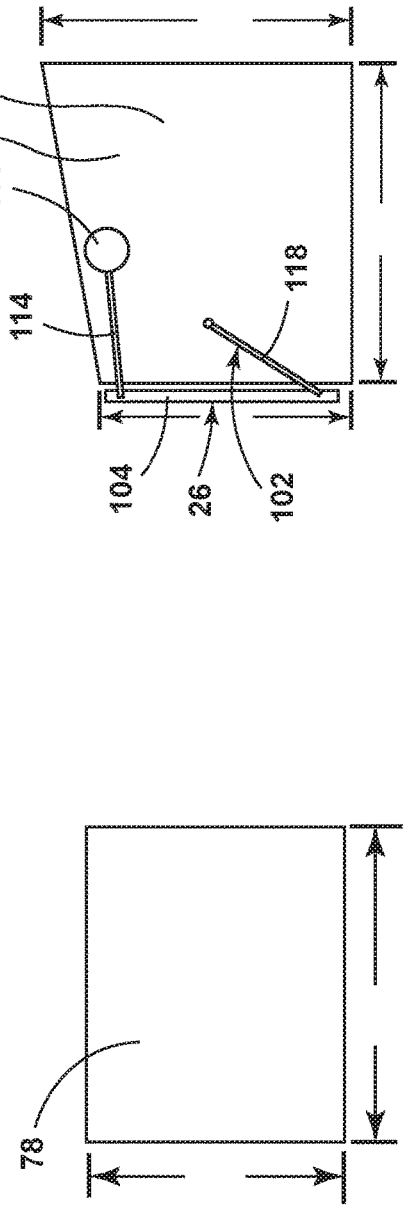
FIG. 2A
FIG. 2B
FIG. 2C

VEHICLE STOWAGE BIN

FIELD OF THE DISCLOSURE

The present disclosure generally relates to a stowage system, and more specifically to a vehicle stowage system having a deployable cover.

BACKGROUND OF THE DISCLOSURE

Vehicle cabins may include designated stowage areas for luggage and passenger items. Stowage areas may include retention mechanisms for securing luggage and passenger items in stowage areas during standard driving conditions and dynamic driving conditions (for example, vehicle collisions). However, improved stowage areas and retention mechanisms are always desired.

SUMMARY OF THE DISCLOSURE

According to a first aspect of the present disclosure, a vehicle comprises a stowage bin, an actuation assembly configured to actuate in response to an actuation signal, and a stowage bin closure operable between stored and fully deployed positions. The actuation assembly is configured to deploy the stowage bin closure over an opening defined by the stowage bin.

Embodiments of the first aspect of the disclosure can include any one or a combination of the following features:
- An actuation assembly including a driving device and a controller.
- An actuation signal input from a vehicle control module.
- A vehicle control module including a body control module.
- A vehicle control module including a restraint control module.
- An actuation signal including an input from a manual actuation.
- A stowage bin closure comprising a linkage assembly coupled to the stowage bin.
- A linkage assembly comprising a first portion disposed on a first side of the stowage bin, and a second portion disposed on a second side of the stowage bin.
- A linkage assembly further comprising a cover disposed between the first portion of the linkage assembly and the second portion of the linkage assembly.
- First and second portions of a linkage assembly, each including one or more links.
- One or more links each including a first pivot point disposed on the stowage bin and a second pivot point disposed on the cover.
- A driving device coupled to one or more of the links and causing the one or more links to move the stowage bin closure between the stored and the fully deployed positions.
- A driving device including a linear drive.
- A driving device including a pyrotechnic drive or a pre tensioner drive.
- A driving device including a linear drive having a first end and a second end. The first end pivotably coupled to the stowage bin, and the second end coupled to the stowage bin closure. The linear drive being selectively engageable to move the stowage bin closure between the stored and the fully deployed positions.
- A pulley system disposed between the linear drive and the stowage bin closure.
- A stowage bin closure including a cover having a plurality of slats disposed between first and second sides of the stowage bin.

According to a second aspect of the present disclosure, a vehicle stowage system, comprises a stowage bin, a cover coupled to the stowage bin proximate top edges of first and second walls of the stowage bin, a linkage assembly disposed between the stowage bin and the cover and including first and second links disposed on each of first and second walls of the stowage bin, and a driving device disposed on at least one of the first and second links, wherein the driving device is selectively engageable to move the cover between a stored position and a deployed position.

Embodiments of the second aspect of the disclosure can include any one or a combination of the following features:
- A deployed position comprises an intermediary position or a fully deployed position.

According to a third aspect of the present disclosure, a vehicle stowage system comprises a cover, a stowage bin, and a linkage assembly disposed between the cover and the stowage bin and having a driving device configured to position the cover in a plurality of intermediary positions between a stored position and a fully deployed position, wherein in the stored position the cover is positionable in a cavity adjacent to the stowage bin in a substantially vertical position and wherein in a plurality of intermediary positions and a fully deployed position the cover is positionable in a substantially horizontal position above the stowage bin.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 2A is a top perspective view of a stowage bin with a stowage bin closure in a stored position, according to an example;

FIG. 2B is a front plan view of the stowage bin of FIG. 2A;

FIG. 2C is a first side elevational view of the stowage bin of FIG. 2A;

DETAILED DESCRIPTION OF THE PREFERRED EMBODIMENTS

Figure 1:
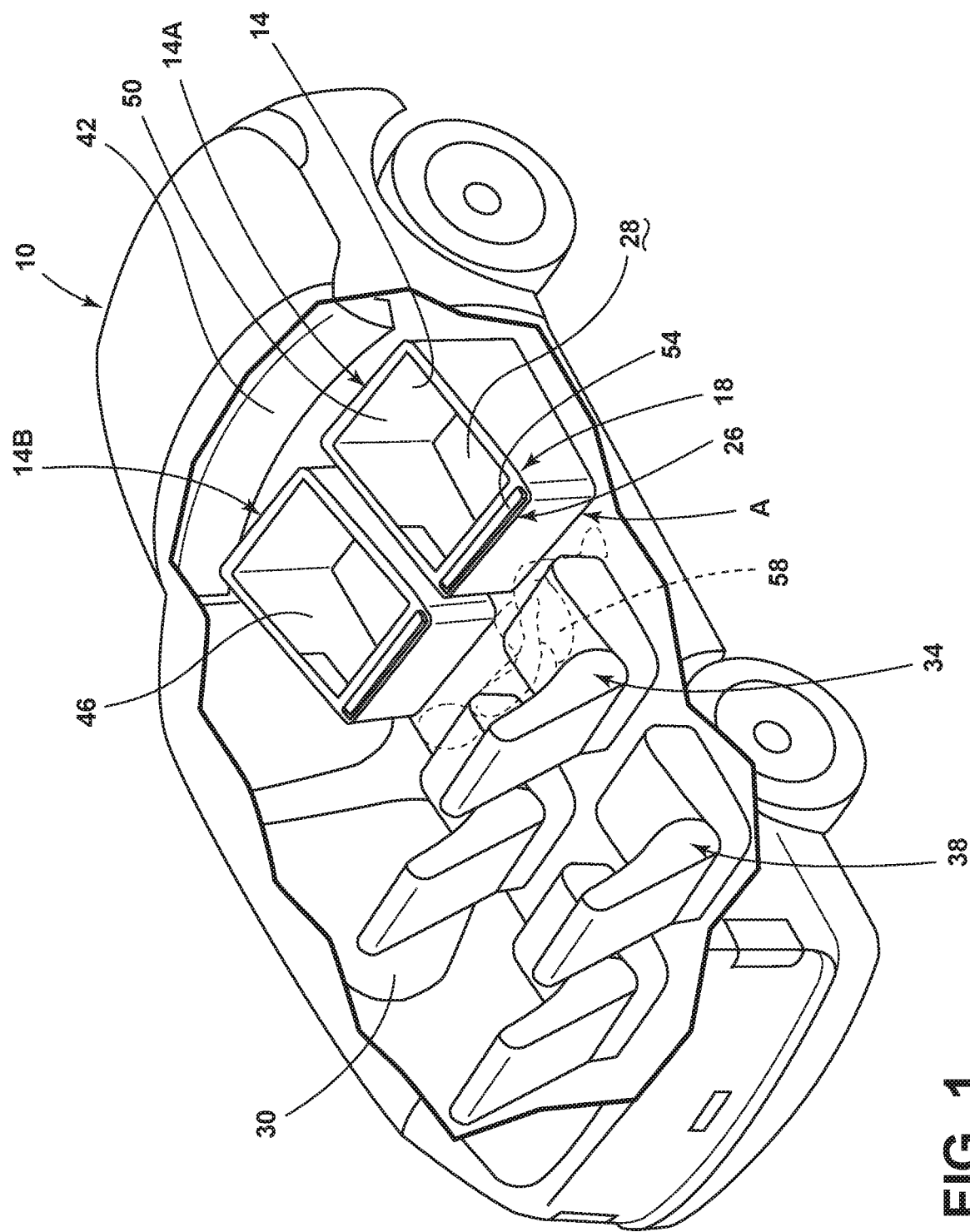
FIG. 1 is a side perspective view of a vehicle interior.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, the term first side may be used to refer to a right side of a seated passenger 58. The term second side may be used to refer to a left side of a seated passenger 58. The term front refers to the front of a seated passenger 58. The term back refers to the back of a seated passenger 58. With reference to FIG. 1, the vehicle 10 may be any type of vehicle 10, such as a car, a truck, a sport utility vehicle, a crossover vehicle, a van, a minivan, a taxi, a bus, an airplane, a boat, a rail car, a subway, etc.

With reference to FIGS. 1-14, a vehicle 10 includes a stowage bin 14, an actuation assembly 18 configured to actuate in response to an actuation signal 22, and a stowage bin closure 26. The stowage bin closure 26 is operable between stored and fully deployed positions A, D. The actuation assembly 18 is configured to deploy the stowage bin closure 26 over an opening 28 defined by the stowage bin 14.

Referring to FIG. 1, an interior 30 of a vehicle 10 is shown. The vehicle 10 may include a first seating row 34 and a second seating row 38. At least one stowage bin 14 may be disposed between the first seating row 34 and the dashboard 42. The vehicle 10 may be an autonomous vehicle. In an autonomous vehicle, the stowage bin 14 may be positioned within the vehicle 10 in a driver seat area 46 and/or a passenger seat area 50. In various examples, in autonomous vehicles and other vehicles, stowage bins 14 may be disposed in various conventional seat locations of the vehicle 10. In various examples, a first stowage bin 14A may be positioned adjacent to a second stowage bin 14B in the same row of seats. In various examples, a single stowage bin 14 may be disposed in a vehicle 10 at a vehicle interior location that is not a conventional seat location. A prime approach may be to locate the stowage bins 14 in place of the conventional front seats (for example, driver seat area 46 and/or passenger seat area 50). However, the stowage bins 14 may also be located in the rear of the vehicle 10 or the middle of the vehicle 10.

With continuing reference to FIG. 1, a stowage bin closure 26 may be disposed in a cavity 54 adjacent to the stowage bin 14 when the stowage bin closure 26 is in a stored position A. The stowage bin closure 26 may be disposed in a substantially vertical position in the stored position A. The stowage bin closure 26 is shown in a stored position A. In a stored position A, the stowage bin 14 contents may be visible and accessible. A seated passenger 58 is shown in the vehicle interior 30.

Stowage bins 14 with deployable stowage bin closures 26 may provide a comfortable driving experience. With ride sharing services, shuttle vehicles, and the advent of autonomous vehicles, vehicle passengers may choose to bring their luggage and personal items into passenger area of the vehicle interior 30. It may be more convenient to store the luggage and personal items in the passenger area of the vehicle interior 30 than in the trunk or behind a last row of seats in the vehicle interior 30. Unrestrained luggage and personal items in the passenger area of a vehicle interior 30 may become projectiles in the event of non-standard driving conditions (such as vehicle collisions and erratic driving). Unrestrained luggage and personal items may impact passengers during non-standard driving conditions. During standard driving conditions, the stowage bin closures 26 may provide a more pleasant appearance in the passenger area of a vehicle interior 30. Also, the deployed stowage bin closures 26 may create a surface on which passengers may place passenger items. Thus, the stowage bin 14 with a stowage bin closure 26 may provide vehicle passengers 58 with a generally safe, conveniently accessible location for containing luggage and personal items. The selectively deployable stowage bin closure 26 may passively contain luggage and passenger items in the stowage bin 14 during non-standard and standard driving conditions.

Referring now to FIG. 2A, a stowage bin closure 26 is shown coupled to a stowage bin 14. The stowage bin 14 may include first, second, third, and fourth walls 70, 74, 78, 82. The first wall 70 may be referred to as the right wall. The second wall 74 may be referred to as a left wall. The third wall 78 may be referred to as a back wall. The fourth wall 82 may be referred to as a front wall. The first and second walls 70, 74 may include top edge portions 86 that may be inclined upward from the third or back wall 78 to the fourth or front wall 82. Also, the top 90 of the third wall 78 may be lower than the top 94 of the fourth wall 82. Because the third wall 78 is lower than the fourth wall 82, a seated passenger 58 may be able to conveniently lift luggage or personal items over the third wall 78 and into the stowage bin 14. In the example shown, the stowage bin 14 includes a floor 98.

With continued reference to FIG. 2A, the stowage bin closure 26 may include a linkage assembly 102 and a cover 104. The linkage assembly 102 may include a first portion 106 disposed on a first side of the stowage bin 14 and a second portion 110 disposed on the second side of the stowage bin 14. The stowage bin closure 26 is shown in a stored position A. The first portion 106 of the linkage assembly 102 may include a first link 114 and a second link 118. The second portion 110 of the linkage assembly 102 may include a first link 114 and a second link 118. The first and second links 114, 118 may each include a first end 122 that may be coupled to the cover 104. The first and second links 114, 118 may each include a second end 126 that may be coupled to the stowage bin 14. The first ends 122 of the first and second links 114, 118 may each be pivotably coupled to the cover 104. The second ends 126 of the first and second links 114, 118 may each be pivotably coupled to the stowage bin 14. A drive mechanism 130 may be coupled to the first or second link 114 or 118 and a wall of the stowage bin 14. In the example shown, the drive mechanism 130 is coupled to the second link 118 and the first wall 70 of the stowage bin 14. As will be further explained later herein, the drive mechanism 130 may be actuated manually or in response to an actuation signal 22.

Referring to FIG. 2B, an elevational view of the third wall 78 of the stowage bin 14 is shown.

Referring to FIG. 2C, a side view of the stowage bin 14 with stowage bin closure 26 is shown.

Figure 3A:
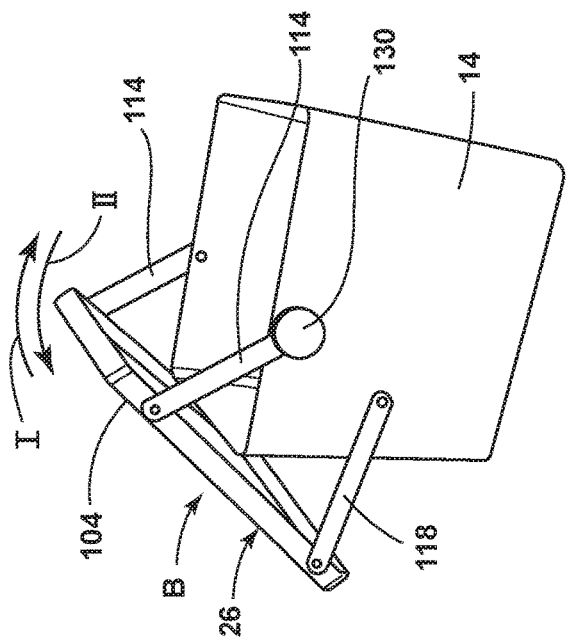
FIG. 3A is a side perspective view of a stowage bin with a stowage bin closure in a stored position.
Figure 3B:
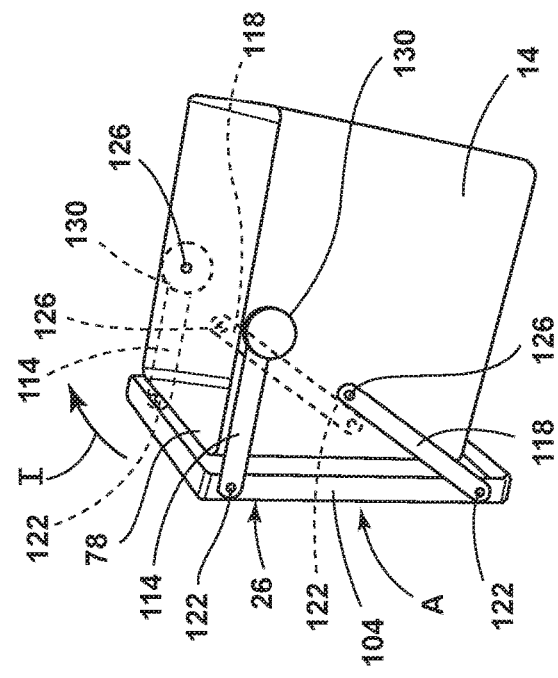
FIG. 3B is a side perspective view of the stowage bin of FIG. 3A with a stowage bin closure in a first partially deployed position.
Figure 3C:
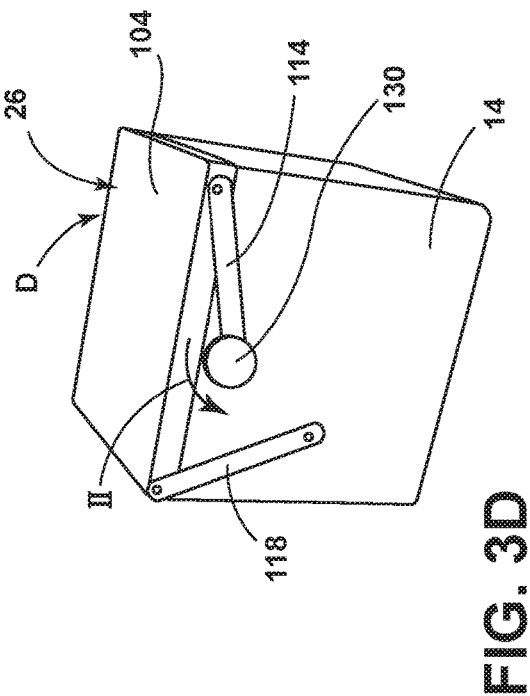
FIG. 3C is a side perspective view of the stowage bin of FIG. 3A with a stowage bin closure in a second partially deployed position.
Figure 3D:
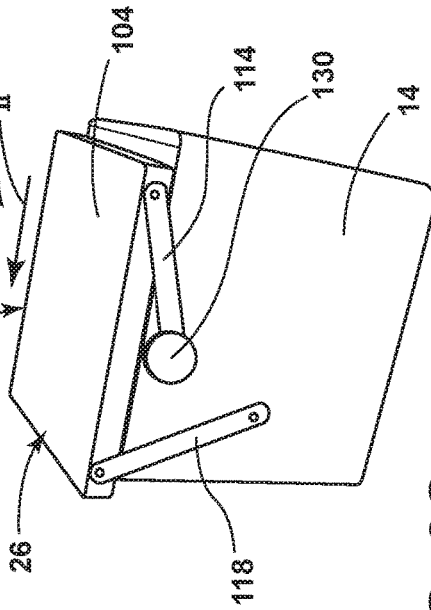
FIG. 3D is a side perspective view of the stowage bin of FIG. 3A with a stowage bin closure in a fully deployed position.

With reference to FIGS. 3A-3D, the stowage bin closure 26 is shown in various positions relative to the stowage bin 14. FIG. 3A shows the stowage bin closure 26 in a stored position A. In the stored position A, the cover 104 is disposed along the back wall 78 of the stowage bin 14, and the stowage bin 14 contents are accessible. The cover 104 may be disposed in a substantially vertical position in the stored position A. FIG. 3B shows the stowage bin closure 26 in a first partially deployed position B. FIG. 3C shows the stowage bin closure 26 in a second partially deployed position C. FIG. 3D shows the stowage bin closure 26 in a fully deployed position D. The cover 104 may be in a substantially horizontal position in the second partially deployed position C and the fully deployed position D. In a fully deployed position D, the storage bin closure 26 conceals the contents of the stowage bin 14. In the example shown in FIGS. 3A-3D, the first, second, third, and fourth walls 70, 74, 78, 82 all have the same height. The first partially deployed position B and the second partially deployed position C may be examples of numerous intermittent positions between the stored position A and the fully deployed position D.

With reference to FIGS. 3A-3D, the drive mechanism 130 may move the cover 104 from the stored position A to the fully deployed position D in the direction shown by arrows I. Conversely, referring sequentially to FIGS. 3D, 3C, 3B, and 3A, the drive mechanism 130 may move the cover 104 from the fully deployed position D, to the second intermediary deployed position C, to the first intermediary deployed position B, and to the stored position A in the direction shown by arrows II.

With reference to FIGS. 3A-3D, it is contemplated a driving device 130 may be disposed at any of the second ends 126 of the first and second links 114, 118 at which the first and second links 114, 118 are attached to the stowage bin 14. Also, with reference to FIGS. 3A-3D, in various examples, it is contemplated that the stowage bin closure 26 could be designed to move beyond the positions shown in FIGS. 3A-3D.

Figure 4:
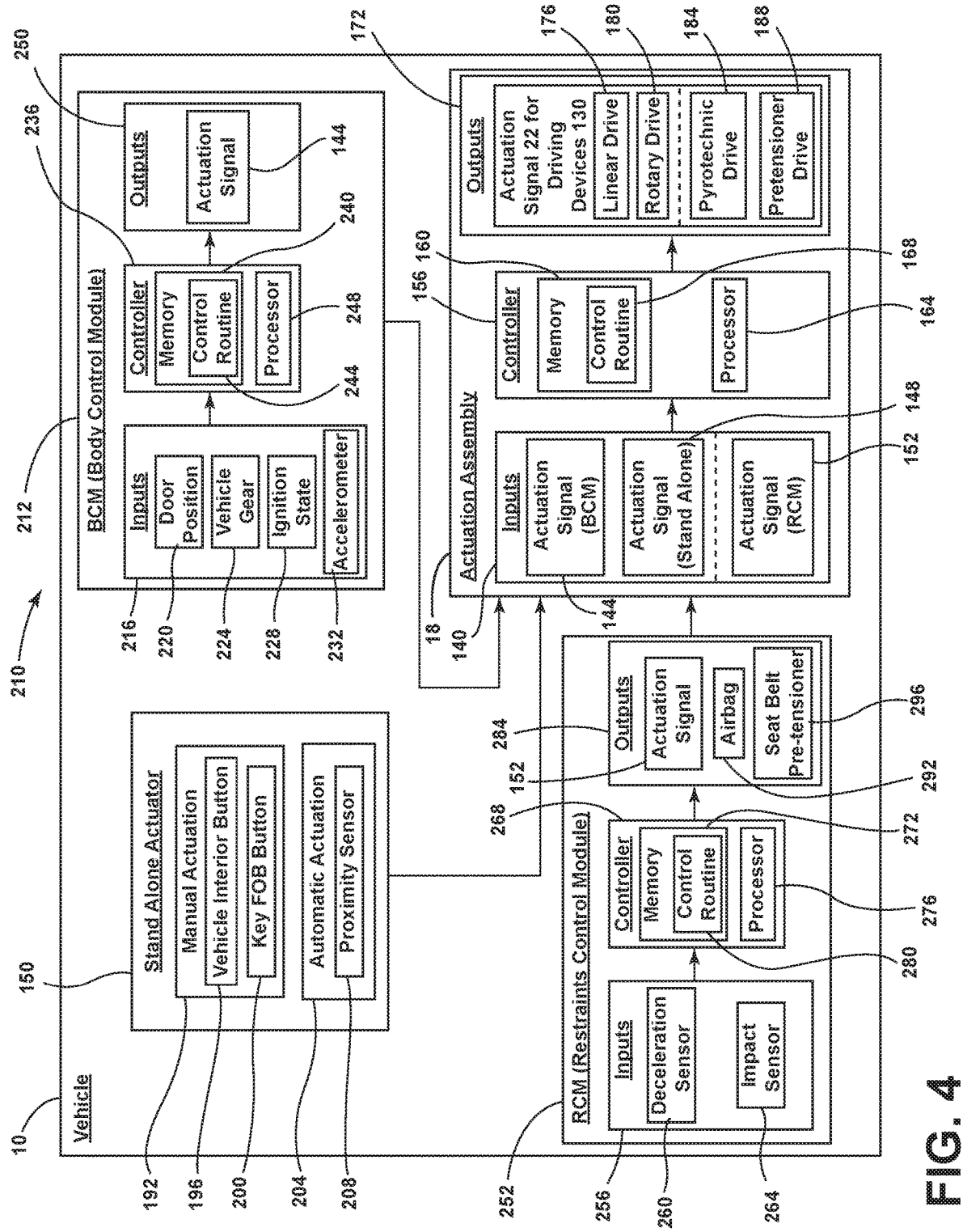
FIG. 4 is a block diagram of a vehicle including an actuation assembly of the stowage bin closure.

Referring now to FIG. 4, a block diagram of the vehicle 10 is shown. The block diagram shows the processes for actuating the stowage bin closure 26. The block diagram may include the actuation assembly 18 for actuating the driving device 130. The actuation assembly 18 may include inputs 140. The inputs 140 may include an actuation signal 144 from the body control module (BCM) 212, a stand-alone actuation signal 148, and an actuation signal 152 from the restraint control module (RCM) 252. The actuation assembly 18 may also receive inputs 140 from other vehicle control modules. A controller 156 may receive the inputs 140. The controller 156 may include a memory 160 and a processor 164. The memory 160 may include a control routine 168. The controller 156 may deliver outputs 172 to driving devices 130. The outputs 172 to the driving devices 130 may include an actuation signal 22 from the controller 156 for actuating the driving devices 130. The driving devices 130 may include a linear drive 176, a rotary drive 180, a pyrotechnic drive 184, and a pre-tensioner drive 188.

Referring again to FIG. 4, during standard driving conditions, it is contemplated that the actuation assembly 18 may receive an actuation signal 148 from a stand-alone actuator 150. A stand-alone actuation signal 148 may be generated by manual actuation 192 (for example, pushing a button 196 in the vehicle interior 30 near the stowage bin closure 26 or pushing a button 200 on a key fob) or by automatic actuation 204 (for example, a sensor such as a proximity sensor 208).

With continued reference to FIG. 4, during standard driving conditions, a BCM 212 may also provide an actuation signal 144 to the actuation assembly 18. The exemplary inputs 216 shown in the BCM 212 may provide input relevant to operation of the actuation assembly 18. The door position 220, the vehicle gear 224, the ignition state 228, and the accelerometer 232 may be inputs 216 that may be communicated to the controller 236. The door position 220 input may indicate whether a vehicle door is open or closed. The vehicle gear 224 input may indicate whether the vehicle 10 is in park or another gear. The ignition state 228 input may indicate whether the engine of the vehicle 10 has been turned on. The accelerometer 232 may indicate whether the vehicle 10 is in motion. The controller 236 may include a memory 240 and a processor 248. The controller 236 may include memory 240 that may include a control routine 244. Based on at least the door position 220, vehicle gear 224, and ignition state 228, the controller 236 may provide an output 250 in the form of an actuation signal 148 to the actuation assembly 18 to actuate the driving device 130. In one example, the stowage bin closure 26 may move from a stored position A to a fully deployed position D when the vehicle 10 starts to move. An accelerometer 232 may detect the movement of the vehicle 10. In one example, the stowage bin closure 26 may move from a fully deployed position D to the stored position A when any vehicle door opens, when the vehicle 10 is placed in park, and when the ignition is turned off.

With continuing reference to FIG. 4, the RCM 252 may also send a signal to the actuation assembly 18. The RCM 252 may detect non-standard driving conditions. The RCM 252 may receive inputs 256. The inputs 256 may include information from a deceleration sensor 260 and information from an impact sensor 264. The inputs 256 may be delivered to the controller 268. The controller 268 may include a memory 272 and a processor 276. The memory 272 may include a control routine 280. The controller 268 may provide outputs 284. The outputs 284 may include the actuation signal 152, the air bag 292, and the seat belt pre-tensioner 296. The RCM 252 may deliver an actuation signal 152 to the actuation assembly 18. Thus, in one example, the RCM 252 may deliver an actuation signal 152 to the actuation assembly 18 to cause the actuation assembly 18 to move from the stored position A to the fully deployed position D during non-standard driving conditions so that items are maintained in the stowage bin 14 and do not travel around the interior 30 of the vehicle 10.

The vehicle block diagram shown in FIG. 4 may depict a vehicle stowage system 210. The vehicle stowage system 210 may include at least a cover 104, a linkage assembly 102, and a driving device 130. The driving device 130 may be selectively engageable to move the cover 104 between a stored positon A and a deployed position. The deployed position may include a fully deployed position D or an intermediary position. The intermediary position may include a first partially deployed position B or a second partially deployed position C.

The vehicle block diagram shown in FIG. 4 is exemplary, and it is contemplated that the actuation assembly 18 may include additional inputs and outputs.

Figure 5A:
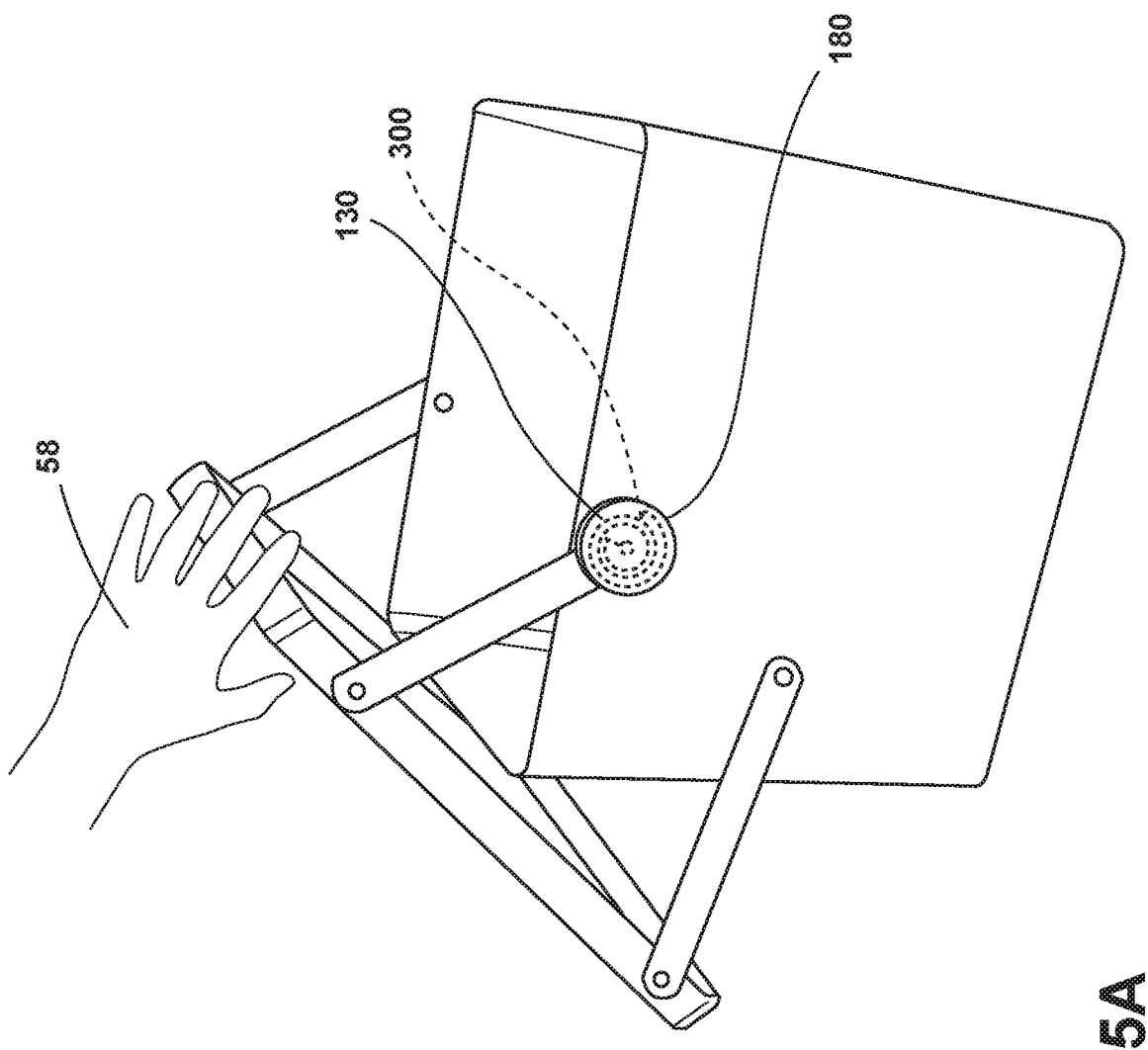
FIG. 5A is a side perspective view of the stowage bin with a stowage bin closure in a first partially deployed position and a rotary driving device, according to an example.

Referring to FIG. 5A, an example of a driving device 130 is shown. The driving device 130 may be a rotary drive 180. The rotary drive 180 may include a resettable, load-limited clock spring 300 with a damper. The resettable, load-limited clock spring 300 with a damper may be deployed manually. As such, in the example show, the driving device 130 shown in FIG. 5 may be moved between at least a stored position A and a fully deployed position D by a passenger 58 (see, hand of passenger 58).

Figure 5B:
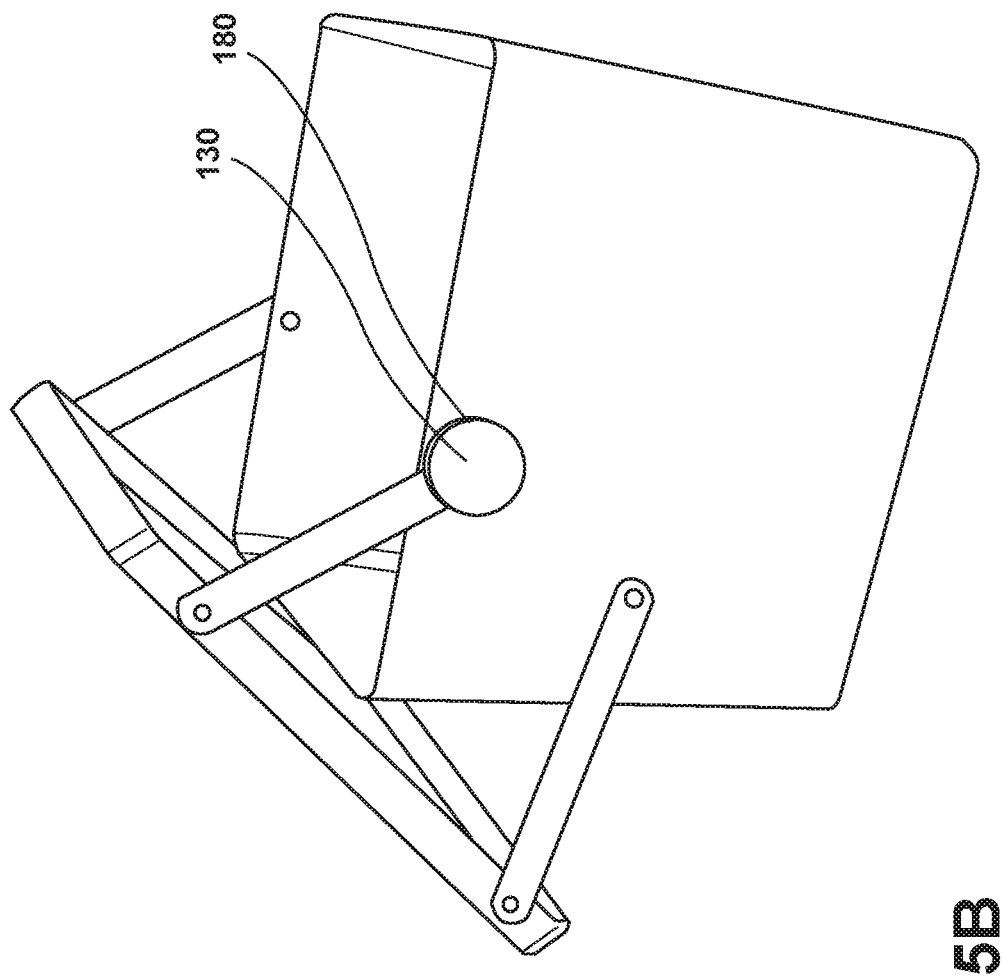
FIG. 5B is a side perspective view of a stowage bin with a stowage bin closure in a first partially deployed position and a rotary driving device, according to an example.

Referring to FIG. 5B, an example of a driving device 130 with a rotary drive 180 is shown. The rotary drive 180 may receive an actuation signal 22 from the controller 156 of the actuation assembly 18. The rotary drive 180 may rotate the stowage bin closure 26 between the stored and fully deployed positions A, D.

Figure 6:
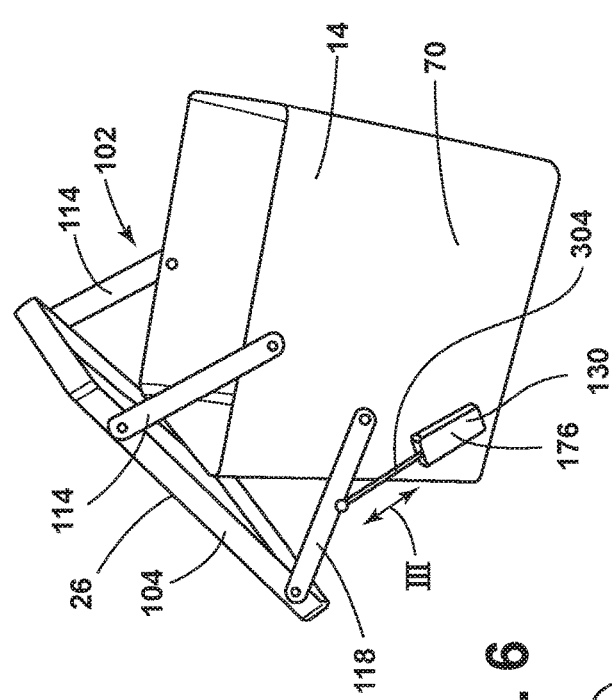
FIG. 6 is a side perspective view of a stowage bin with a linear actuator disposed between the stowage bin and a link, according to an example.
Figure 8:
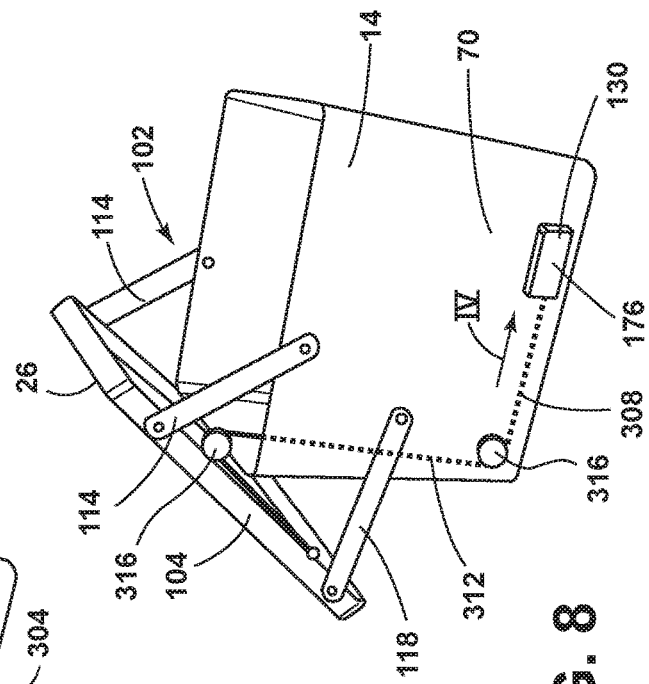
FIG. 8 is a side perspective view of a stowage bin with a linear actuator disposed on the stowage bin and a pulley assembly disposed between the linear actuator and the cover of the stowage bin, according to an example.
Figure 7:
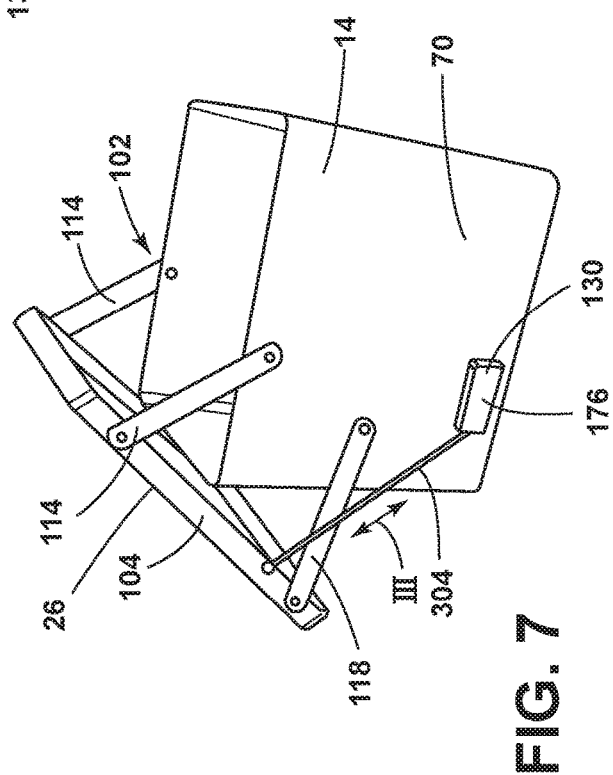
FIG. 7 is a side perspective view of a stowage bin with a linear actuator disposed between the stowage bin and the cover, according to an example.

Referring to FIGS. 6-8, an example of a stowage bin 14 and a stowage bin closure 26 with a driving device 130 that is a linear drive 176 is shown. With reference to FIG. 6, the linear drive 176 may be disposed on a first wall 70 of the stowage bin 14. The linear drive 176 may include a rod 304 that is extendable and retractable in the directions shown by arrow III to push the stowage bin closure 26 upward towards a fully deployed position D. The rod 304 may telescope in and out of the linear drive 176. The linear drive 176 may include a rod 304 that is extendable and retractable in the directions shown by arrow III to pull the stowage bin closure 26 downward towards a stored position A. With reference to FIG. 6, the rod 304 is shown coupled to the second link 118 of the linkage assembly 102. With reference to FIG. 7, the linear drive 176 and the rod 304 of the linear drive 176 are shown disposed on the stowage bin 14. The rod 304 of the linear drive 176 is shown attached to the cover 104. The rod 304 of the linear drive 176 may be extendable and retractable in the directions shown by arrow III to push the stowage bin closure 26 upward towards a fully deployed position D. The rod 304 of the linear drive 176 may be extendable and retractable in the directions shown by arrow III to pull the stowage bin closure 26 downward toward a stored position A. The rod 304 may telescope in and out of the linear drive 176.

Referring to FIG. 8, the linear drive 176 is shown attached to a pulley system 308. The pulley system 308 may include a line 312 that is routed around two rollers 316. The line 312 may be pulled inward in the direction shown by arrow IV by the linear drive 176 to move the stowage bin cover 104 from the stored position A to the fully deployed position D. The linear drive 176 shown in FIG. 8 may utilize manual or other means to move the stowage bin cover 104 from the fully deployed position D to the stored position A.

Figure 9:
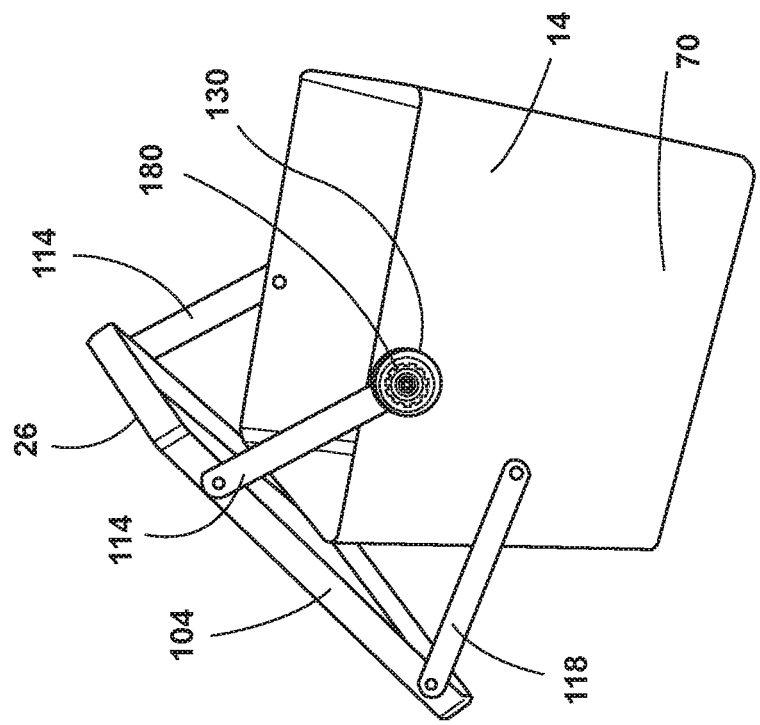
FIG. 9 is a side perspective view of a stowage bin including a pyrotechnic rotary device, according to an example.

Referring to FIG. 9, the stowage bin 14 with stowage bin closure 26 is shown with a pyrotechnic drive 184 disposed in the driving device 130. An actuation signal 288 from the RCM 252 may actuate the pyrotechnic drive 184. One type of pyrotechnic device may be a pre-tensioner.

Figure 10:
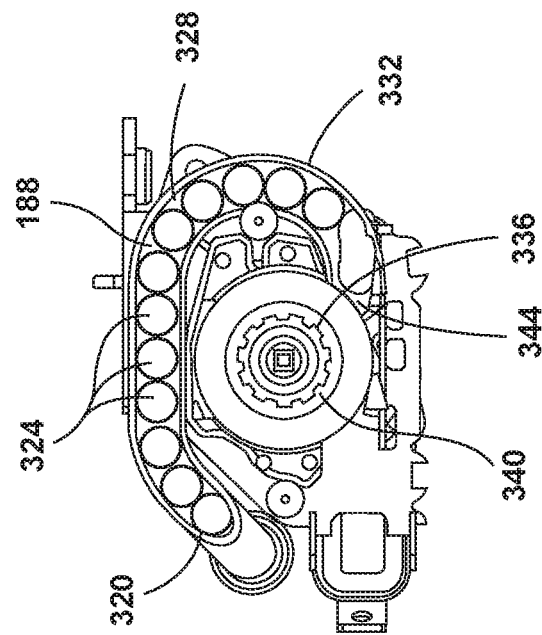
FIG. 10 is a side cross-sectional view of an example of a pyrotechnic rotary device, according to an example.

Referring to FIG. 10, an example of a pre-tensioner drive 188 is shown. The pre-tensioner drive 188 may be disposed in the location of the rotary drive 180 of FIG. 9. The pre-tensioner drive 188 may be a ball-in-tube retractor pre-tensioner. The ball-in-tube retractor pre-tensioner may pre-tension the stowage bin closure 26 by pulling the stowage bin closure 26 to move the stowage bin closure 26 to a fully deployed position D with a rotary motion of the pre-tensioner. A micro gas generator (MGG) 320 may act as an inflator by burning a propellant and driving aluminum balls 324 around a track 328 in the frame 332 of the device. The aluminum balls 324 may push against teeth 336 in the wheel 340 to cause the wheel 340 to rotate by transferring the linear thrust of the aluminum balls 324 to the rotary motion of the wheel 340. When the aluminum balls 324 are spent, the aluminum balls 324 may enter a storage space 344 in the frame 332.

Figure 11:
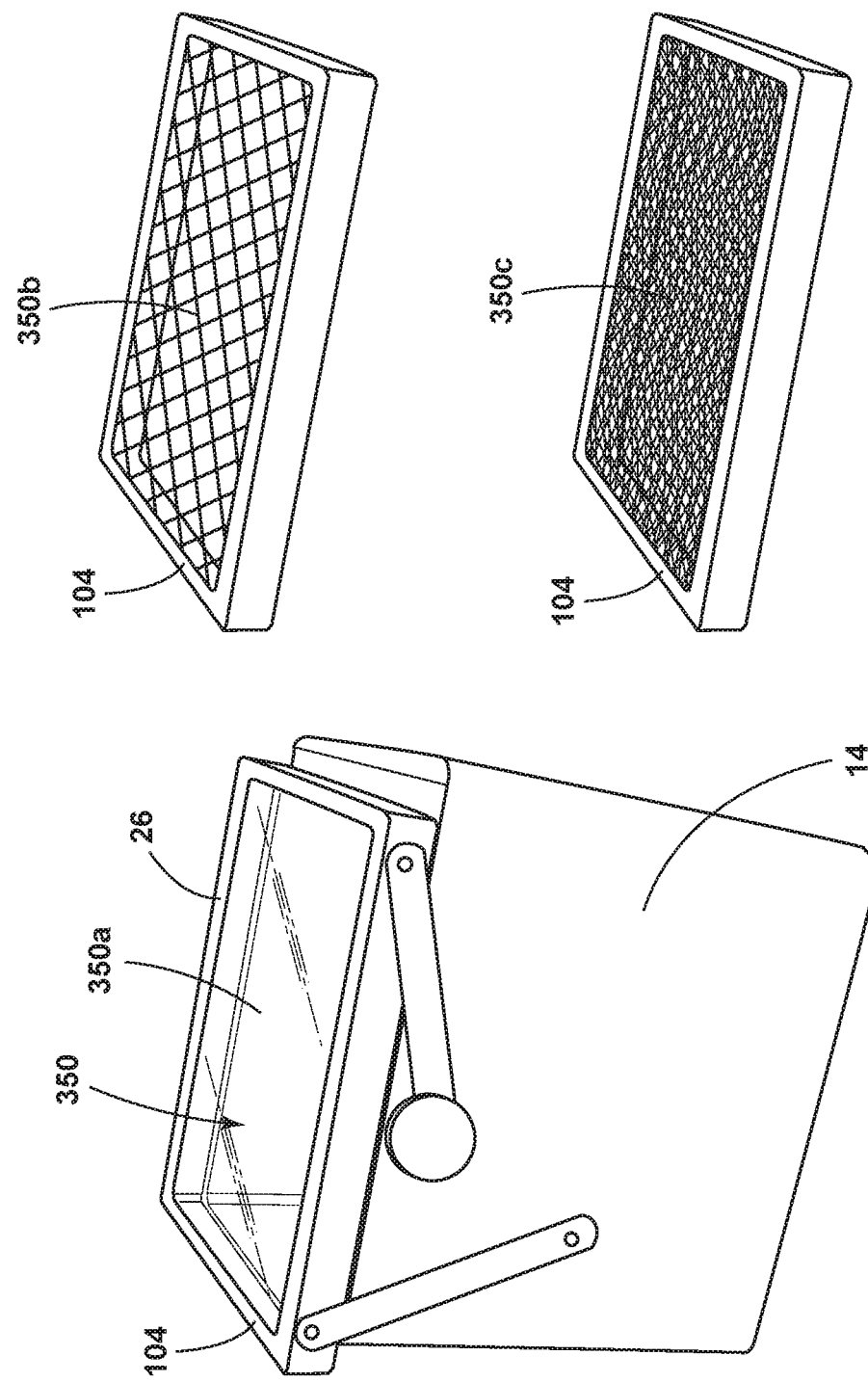
FIG. 11 is a side perspective view of a stowage bin with a see-through portion, according to an example.

With reference now to FIG. 11, an example of a stowage bin closure 26 with a see-through cover portion 350 is shown. The stowage bin closure 26 may include a see-through cover portion 350 that may be a transparent plastic 350a. In various examples, the see-through cover portion 350 may also be a net 350b or a mesh 350c. It may be convenient for a passenger to be able to see the contents of the stowage bin 14 through the stowage bin closure 26.

Figure 12:
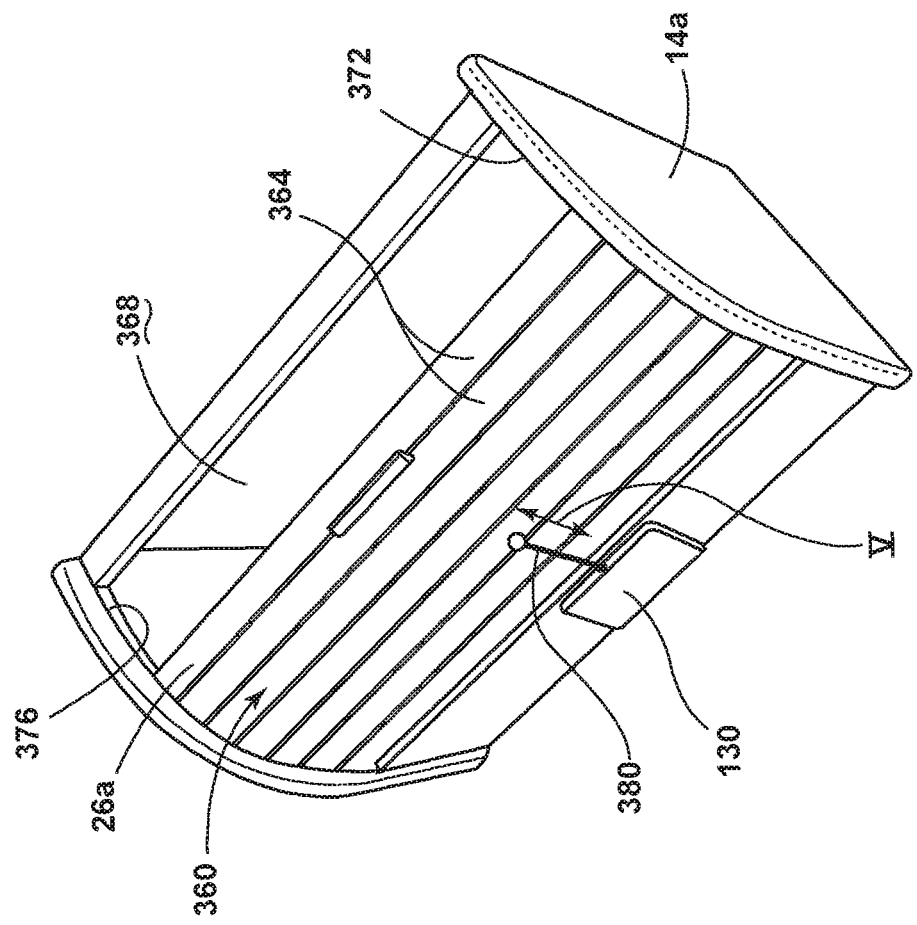
FIG. 12 is a side perspective view of a stowage bin with a roll-top bin cover, according to an example.

With reference to FIG. 12, an example of a stowage bin closure 26 is shown with a roll-top bin cover 360. The roll-top bin cover 360 may move from a stored position A to a fully deployed position D. The roll-top bin cover 360 may include slats 364 that may extend across the opening 368 of the stowage bin 14a. The ends of the slats 364 may be disposed in first and second channels 372, 376 of the first and second sides of the roll-top bin cover 360. A driving device 130 may be coupled to the bottom portion of the stowage bin 14. The driving device 130 may include a push rod 380. The push rod 380 may extend and retract in the direction shown by arrow V to move the roll-top bin cover 360 between the stored and fully deployed positions A, D.

Figure 13:
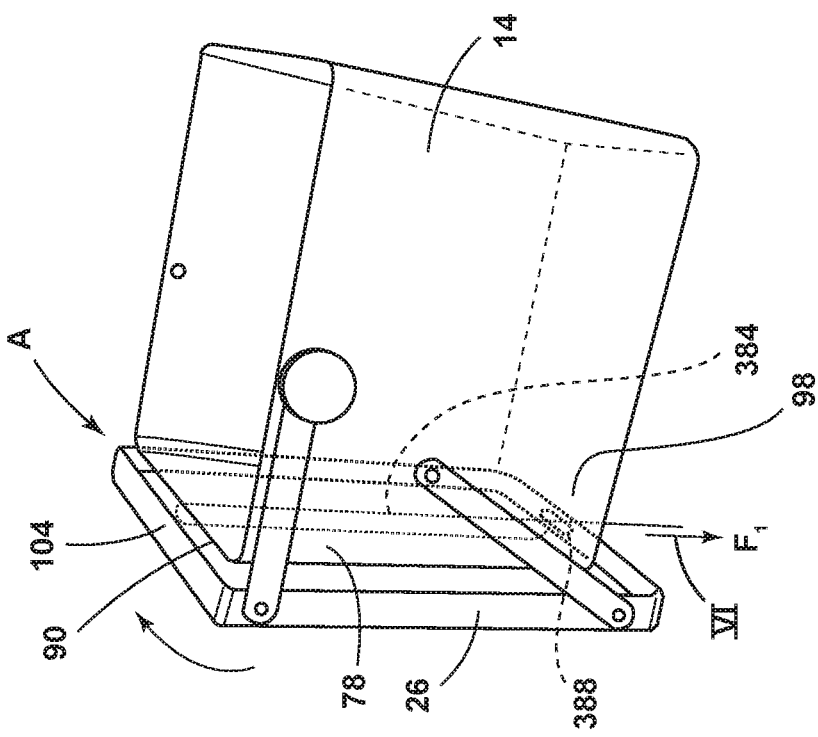
FIG. 13 is a side perspective view of a stowage bin with a tension-driven stowage bin closure.

Referring now to FIG. 13, an example of the tension-driven stowage bin closure 26 is shown. A tension force Ft may be applied to a string 384 or other connector attached to the bottom of the cover 104. The string 384 or other connector may be routed around the top edge 90 of a third or back wall 78 of the stowage bin 14. The string 384 may be pulled through a hole 388 in the floor 98 of the stowage bin 14. The force $F_1$ may move the cover 104 from a stored position A to a fully deployed position D.

Figure 14:
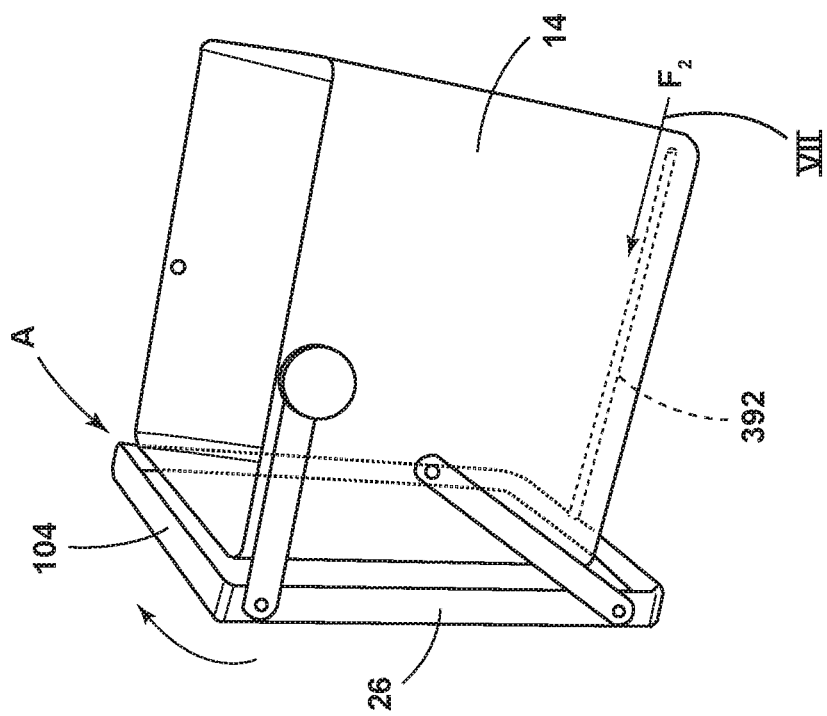
FIG. 14 is a side perspective view of a stowage bin with a compression-driven stowage bin closure.

Referring to FIG. 14, an example of a compression-driven stowage bin closure 26 disposed atop the stowage bin 14 is shown. A force $F_2$ may be applied in the direction shown by arrow VII to exert compression on the cover 104 to move the cover 104 from the stored position A to the fully deployed position D. The force $F_2$ may be applied to a rod 392 or another stiff member.

A variety of advantages may be derived from use of the present disclosure. Luggage and personal items may be restrained in the stowage bin 14 during standard driving conditions and non-standard driving conditions. The stowage bin closure 26 may be placed in a fully deployed position D, a stored position A, and a plurality of intermediary positions between the fully deployed position D and the stored position A (for example, the first intermediary deployed position B and the second intermediary deployed position C). The stowage bin closure 26 may be automatically actuated based on signals from vehicle control modules such as the BCM 212 and the RCM 252. The stowage bin closure 26 may be actuated by a stand-alone actuator 150.

The stowage bin closure 26 may also be manually actuated by a passenger 58. The stowage bin closure may include a see-through cover portion 350. The stowage bin closure may be positioned in the second intermediary deployed position C to restrain luggage and passenger items while minimizing the likelihood of an item (for example, the hand of a passenger 58) becoming trapped between the cover 104 and the stowage bin 14. As such, the vehicle stowage system provides comfort and convenience to a vehicle passenger.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
a stowage bin;
an actuation assembly configured to actuate in response to an actuation signal; and
a stowage bin closure operable between stored and fully deployed positions, wherein the actuation assembly is configured to deploy the stowage bin closure over an opening defined by the stowage bin, wherein the actuation assembly includes a driving device and a controller, wherein the stowage bin closure comprises a linkage assembly coupled to the stowage bin, wherein the linkage assembly comprises a first portion disposed on a first side of the stowage bin, a second portion disposed on a second side of the stowage bin, and a cover disposed between the first portion of the linkage assembly and the second portion of the linkage assembly, wherein the first and second portions of the linkage assembly each include one or more links, wherein each of the one or more links include a first pivot point disposed on the stowage bin and a second pivot point disposed on the cover, wherein the driving device is coupled to one or more of the links and causes the one or more links to move the stowage bin closure between the stored and the fully deployed positions, wherein the driving device includes a linear drive, and wherein a pulley system is disposed between the linear drive and the stowage bin closure.

2. The vehicle of claim 1, wherein the actuation signal is an input from a vehicle control module.

3. The vehicle of claim 2, wherein the vehicle control module includes a body control module.

4. The vehicle of claim 2, wherein the vehicle control module includes a restraint control module.

5. The vehicle of claim 4, wherein the driving device further includes a pyrotechnic drive or a pre-tensioner drive.

6. The vehicle of claim 1, wherein the actuation signal includes an input from a manual actuation.

7. The vehicle of claim 1, wherein the pulley system includes a line routed around a roller and wherein the linear drive is selectively engageable to exert a force on the line to move the stowage bin closure between the stored and the fully deployed positions.

8. The vehicle of claim 1, wherein the cover includes a plurality of slats disposed between first and second sides of the stowage bin.

9. A vehicle stowage system, comprising:
a stowage bin;
a cover coupled to the stowage bin proximate top edges of first and second walls of the stowage bin;
a linkage assembly disposed between the stowage bin and the cover and including:
first and second links disposed on each of first and second walls of the stowage bin;
a driving device disposed on at least one of the first and second links, wherein the driving device is selectively engageable to move the cover between a stored position and a deployed position, and wherein the cover is internal to the vehicle when the cover is in the deployed position; and
a pulley system disposed between the driving device and the cover.

10. The vehicle stowage system of claim 9, wherein the deployed position comprises
an intermediary position or a fully deployed position.

11. A vehicle stowage system comprising:
a cover;
a stowage bin; and
a linkage assembly rotatably coupled to the stowage bin at a fixed location, rotatably coupled to the cover at a fixed location, and disposed between the cover and the stowage bin and having a driving device configured to position the cover in a plurality of intermediary positions between a stored position and a fully deployed position, wherein in the stored position the cover is positionable in a cavity adjacent to the stowage bin in a substantially vertical position and wherein in a plurality of intermediary positions and a fully deployed position the cover is positionable in a substantially horizontal position above the stowage bin.

12. The vehicle stowage system of claim 11, wherein the driving device includes a compression-driven driving device disposed along a floor of the stowage bin and a stiff member disposed between the compression-driven driving device and the cover and wherein the compression-driven driving device is configured to exert a pressure on the stiff member to move the cover from the fully deployed position to the stored position.

13. The vehicle stowage system of claim 11, wherein the driving device includes a tension-driven driving device configured to exert a force on a connector extending from the tension-driven driving device to the cover, wherein the force exerted on the connector moves the cover from the stored position to the fully deployed position.

14. The vehicle stowage system of claim 11, further comprising: a pulley system extending between the driving device and the cover.

15. The vehicle stowage system of claim 14, wherein the pulley system includes a line and a roller coupled to the stowage bin.

* * * * *